United States Patent [19]
Koehler

[11] Patent Number: 6,021,233
[45] Date of Patent: Feb. 1, 2000

[54] WDM RING TRANSMISSION SYSTEM HAVING REDUCED ADJACENT CHANNEL CROSS-TALK

[75] Inventor: Steffen D. Koehler, Annapolis, Md.

[73] Assignee: Ciena Corporation, Linthicum, Md.

[21] Appl. No.: 09/024,370

[22] Filed: Feb. 12, 1998

[51] Int. Cl.[7] ...................................................... G02B 6/02
[52] U.S. Cl. ................ 385/24; 385/14; 385/37; 385/8; 359/115; 359/118; 359/124
[58] Field of Search ..................... 385/24, 14, 2, 385/4, 8, 9, 10, 32, 37; 359/115, 118, 119, 124, 127, 128, 132, 133, 130

[56] References Cited

U.S. PATENT DOCUMENTS

5,764,821  6/1998  Glance ........................................ 385/14
5,886,801  3/1999  Van Deventer ............................ 385/24

*Primary Examiner*—Phan T. H. Palmer
*Attorney, Agent, or Firm*—David L. Soltz

[57] ABSTRACT

A WDM ring configuration having reduced adjacent channel cross-talk is disclosed. In the WDM ring, an add/drop element having a filter for selecting an optical signal at a desired wavelength is spaced from another add/drop element having a filter adding an optical signal at an adjacent wavelength within a channel plan by at least one add/drop element that adds/drops an optical signal at a wavelength which is not next to either the optical signal at the desired wavelength or the adjacent wavelength.

19 Claims, 8 Drawing Sheets

WDM RING TRANSMISSION SYSTEM HAVING REDUCED ADJACENT CHANNEL CROSS-TALK

BACKGROUND OF THE INVENTION

The present invention is directed toward a wavelength division multiplexed (WDM) ring system having reduced adjacent channel cross-talk.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and data communication networks, such as local area networks (LANs) and wide area networks (WANs).

Currently, many optical communication systems are configured to carry an optical signal of a single wavelength over one or more optical waveguides such as optical fibers. To convey information from multiple sources, time-division multiplexing (TDM) is frequently employed. In TDM, a particular time slot is assigned to each signal source with the complete signal constructed from portions of the signal collected from each time slot. While this is a useful technique for carrying plural information sources on a single channel, i.e., at a single wavelength, it is prohibitively expensive to increase the TDM data rate.

While the need for communication services increases, the current capacity of existing waveguiding media is limited. Although capacity may be expanded (e.g., by laying more fiber optic cables), the cost of such expansion is often prohibitive. Consequently, there exists a need for a cost-effective way to increase the capacity of existing optical waveguides.

Wavelength division multiplexing (WDM) is an approach for increasing the capacity of existing fiber optic networks. WDM systems typically include a plurality of transmitters, each respectively transmitting signals on a designated wavelength. As a result, fiber capacity can be increased by a multiple equal to the number of wavelengths or channels.

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring. At least one optical add/drop element, associated with each node, is provided along the ring to permit both addition and extraction of optical signals at a particular wavelength to and from the ring. One of the nodes, referred to as a hub or central office node, has a plurality of associated add/drop elements for transmitting and receiving a corresponding plurality of optical signals at respective wavelengths to/from other nodes along the ring.

Each optical signal in a WDM system is typically at a wavelength within a relatively narrow range about 1550 nm, which is the absorption minimum associated with most silica-based optical fibers. Accordingly, the wavelengths are somewhat narrowly spaced, typically by about 100–200 GHz, but sufficiently far apart to be separated by add/drop elements including dielectric filters. The filters, however, still drop an attenuated portion of optical signals at wavelengths close to the desired wavelength. Typically, provided that the power level of an optical signal at the adjacent wavelength is not significantly more than the power level of the optical signal at the desired wavelength, the filter can output the desired optical signal at a level at least 20 dB greater than the optical signal at the adjacent wavelength power level, thereby permitting accurate detection of the desired optical signal.

In a WDM ring system, however, the optical signal at the desired wavelength may be transmitted from an emitter located at a node spaced relatively far from the corresponding receiver, while an emitter transmitting an optical signal at a wavelength adjacent the desired wavelength may be spaced relatively close to the receiver sensing the optical signal at the desired wavelength. As a result, the power level of the optical signal at the adjacent wavelength input to the filter at the receiver can be significantly greater than that of the optical signal at the desired wavelength. Thus, both optical signals at the desired and adjacent wavelengths are supplied to the receiver at comparable power levels. Such "adjacent channel cross-talk" prevents accurate detection of the optical signal at the desired wavelength.

Moreover, each filter imposes an incremental loss on optical signals propagating along the WDM ring. Accordingly, a particular optical signal traversing a given number of filters along the ring can incur significantly more loss than other optical signals at different wavelengths traversing fewer filters. The loss associated with the particular optical signal can be so high as to limit the ring circumference.

SUMMARY OF THE INVENTION

In accordance with the present invention, a WDM ring configuration is provided which minimizes signal loss and adjacent channel cross-talk. In particular, in order to reduce incoherent cross-talk principally due to adjacent channels or wavelengths, an add/drop element for selecting an optical signal at a desired wavelength is spaced from an add/drop element adding an optical signal at an adjacent wavelength within a channel plan by at least one add/drop element that adds and/or drops an optical signal at a wavelength which is not next to either the desired wavelength or the adjacent wavelength. Accordingly, the added optical is attenuated and adjacent channel cross-talk is reduced.

In addition, to minimize loss, each optical signal at a given wavelength typically traverses the add/drop elements associated with the remaining wavelengths before being supplied to a receiver. Accordingly, no single optical signal has a disproportionately higher loss due to the add/drop elements than the remaining optical signals. Thus, the diameter of the WDM ring and/or the number of filters provided along the ring can be increased to accommodate additional wavelengths.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Figure 1:
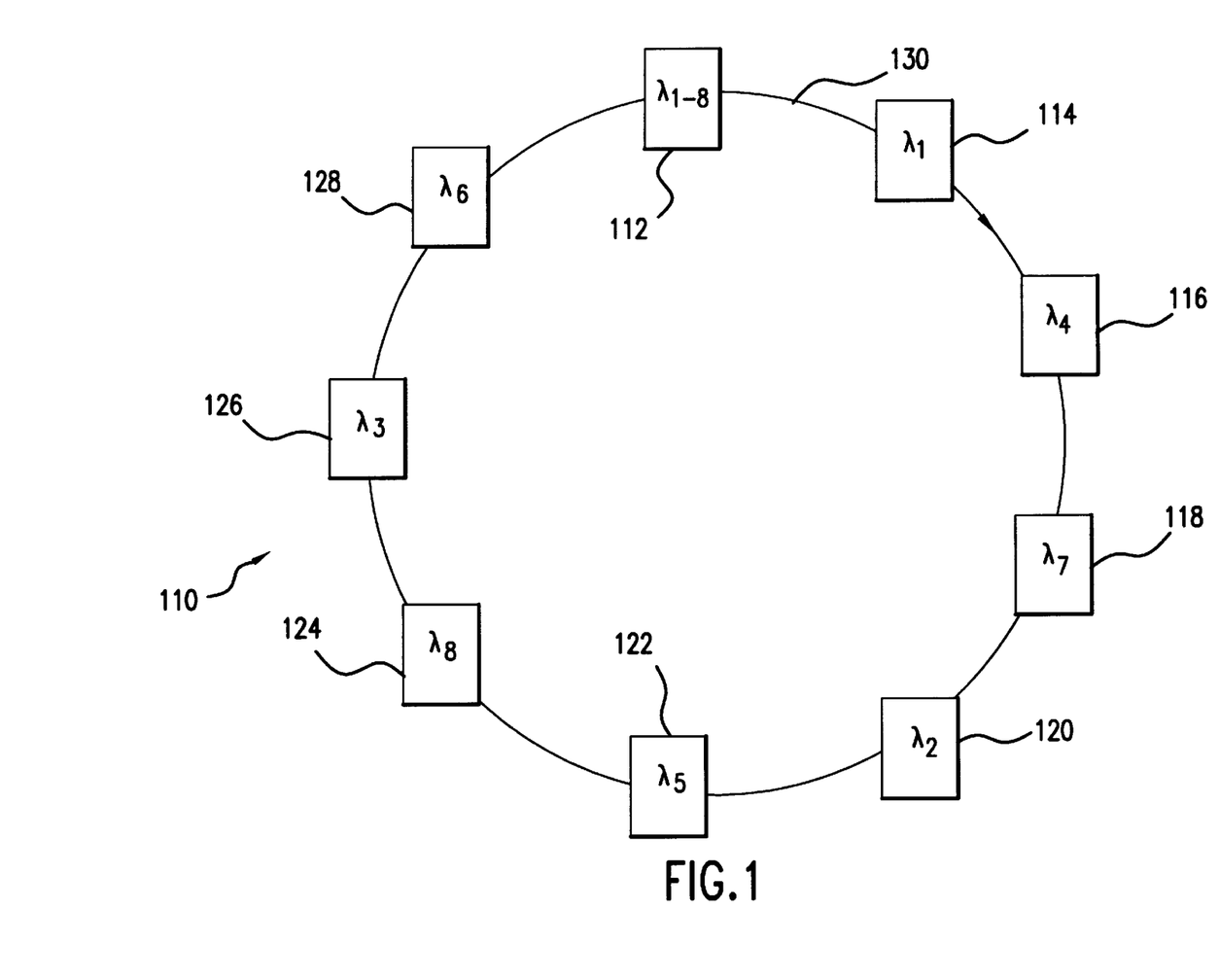
FIG. 1 illustrates a block diagram of a WDM ring system in accordance with the present invention.

Turning to the drawings in which like reference characters indicate the same or similar elements in each of the several views, FIG. 1 illustrates a functional block diagram of a WDM ring system 110 in accordance with the present invention. Typically, WDM ring 110 includes a plurality of nodes 112, 114, 116, 118, 120, 122, 124, 126 and 128 connected along a continuous or looped optical path 130. One of these nodes, node 112, for example, can be a central office or hub node that transmits and receives all the optical signals carried by the WDM ring, while the remaining nodes typically include transmitters and receivers associated with a respective one of these optical signals. The present invention, however, is not limited to the WDM ring configuration having a central hub shown in FIG. 1. Rather, the present invention is applicable to WDM ring configurations lacking a central office node, but wherein each node adds or drops one or more of the optical signals at one or more corresponding wavelengths.

Figure 2:
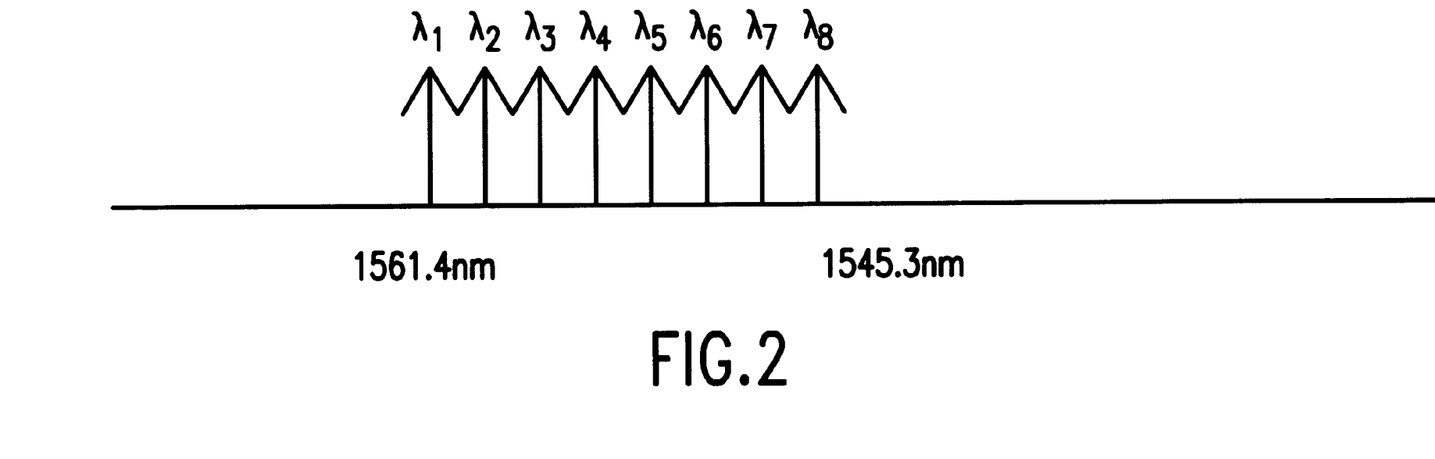
FIG. 2 shows an exemplary channel plan associated with the present invention.

Each optical signal is at a respective one of a plurality (typically more than six) of wavelengths, which conform to a channel plan, an example of which is shown in FIG. 2. Here, the wavelengths are represented by uniformly spaced arrows, which successively increase from a lowest wavelength value of 1561.4 nm to 1545.3 nm. This channel plan is exemplary, however, and it is understood that any suitable range of wavelengths with any appropriate spacing is within the scope of the invention.

Figure 3:
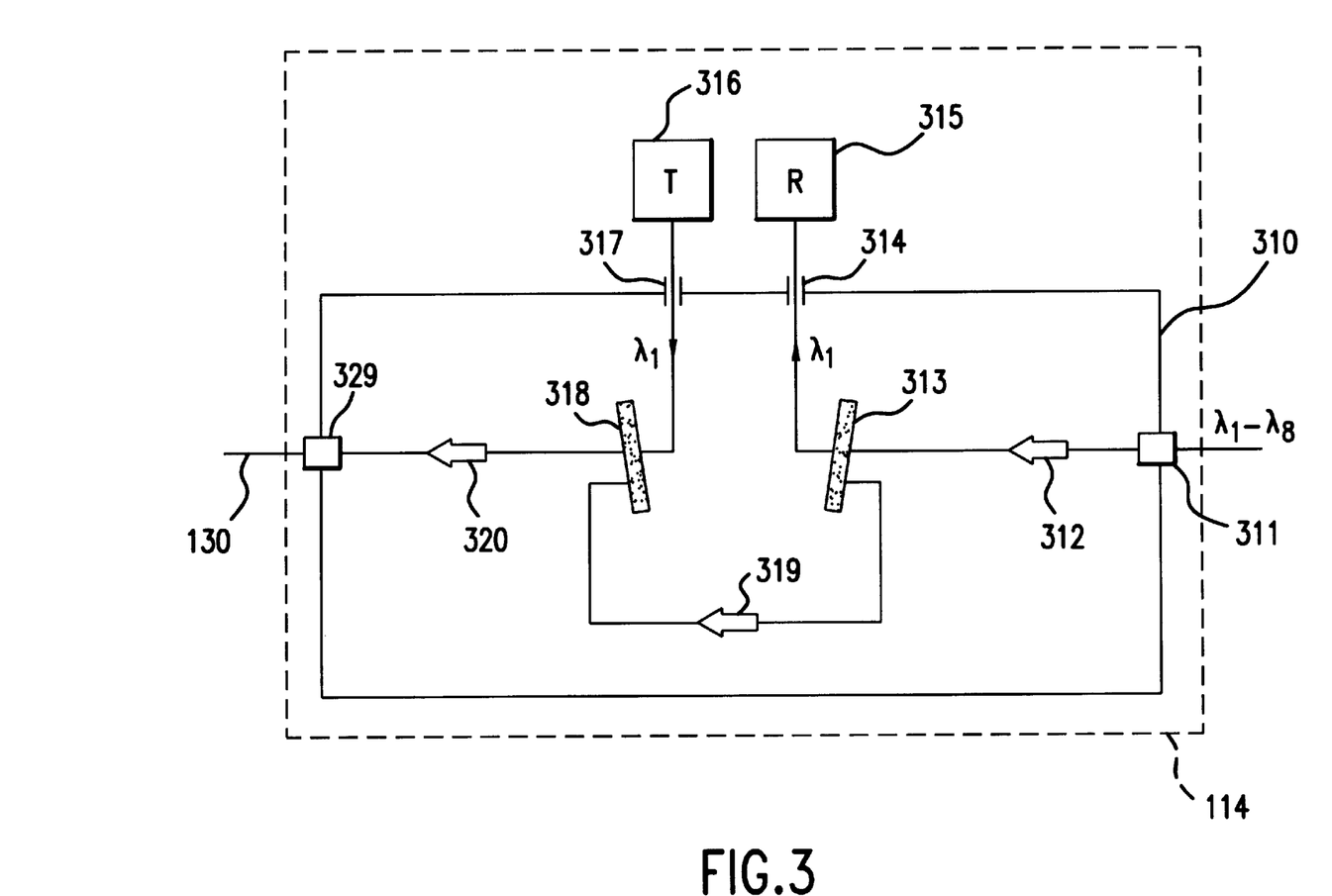
FIG. 3 illustrates an exemplary add/drop element.

FIG. 3 illustrates node 114 in greater detail. Typically, nodes 116, 118, 120, 122, 124, 126, and 128 have a similar construction as node 114. Generally, node 114 includes an optical add/drop element 310 (discussed in greater detail in U.S. patent application Ser. No. 08/956,807, filed Oct. 23, 1997 and incorporated by reference herein), which can insert and/or extract an optical signal at a particular wavelength, but the present invention is not limited to the exemplary add/drop element construction shown in FIG. 3, and other add/drop element configurations supporting a continuous optical path are considered within the scope of the invention. As further shown in FIG. 3, optical signals at wavelengths $\lambda_{1-8}$ output from central office node 112 are fed to optional connector 311 of add/drop element 310 in a direction indicated by arrow 312 to dielectric filter 313. Typically, dielectric filter 313 is configured to drop or select one of the optical signals at a corresponding one of wavelengths $\lambda_{1-8}$, in this example $\lambda_1$, while reflecting the remaining wavelengths, $\lambda_{2-8}$.

After passing through filter 313, the optical signal at wavelength $\lambda_1$ is input to a known optical receiver 315 via port 314. Receiver 314 can then output the information contained in the optical signal in either electrical or optical form from node 114. Information can also be input to node 114 and transmitted as an optical signal at wavelength $\lambda_1$ by a known transmitter or optical emitter 316. The optical signal is then input to add/drop element 310 through port 317 to an additional dielectric filter 318.

Remaining optical signals at wavelengths $\lambda_{2-8}$ are also supplied in a direction indicated by arrow 319, to filter 318. Filter 318, like filter 313, is configured to pass wavelength $\lambda_1$, for example, and reflect the remaining wavelengths. Accordingly, the optical signal at wavelength $\lambda_1$ is combined with the remaining optical signals at wavelengths $\lambda_{2-8}$, such that each optical signal propagates in a common direction on optical path 130 through connector 329 in a direction indicated by arrow 320. Connectors 311 and 329 are typically selected from the group of commercially available FC/PC, FC/APC, SC/PC, SC/APC, biconic, ST and Diamond E2000 connectors. Alternatively, connectors 311 and 329 can be omitted and optical connections to the add/drop element can be made with fusion splices, for example. It is noted that the exemplary add/drop element shown in FIG. 3 does not include a regenerator having optical to electrical to optical conversion for wavelengths $\lambda_{2-8}$. Accordingly, a continuous optical path typically circulates through WDM ring system 110.

Figure 4:
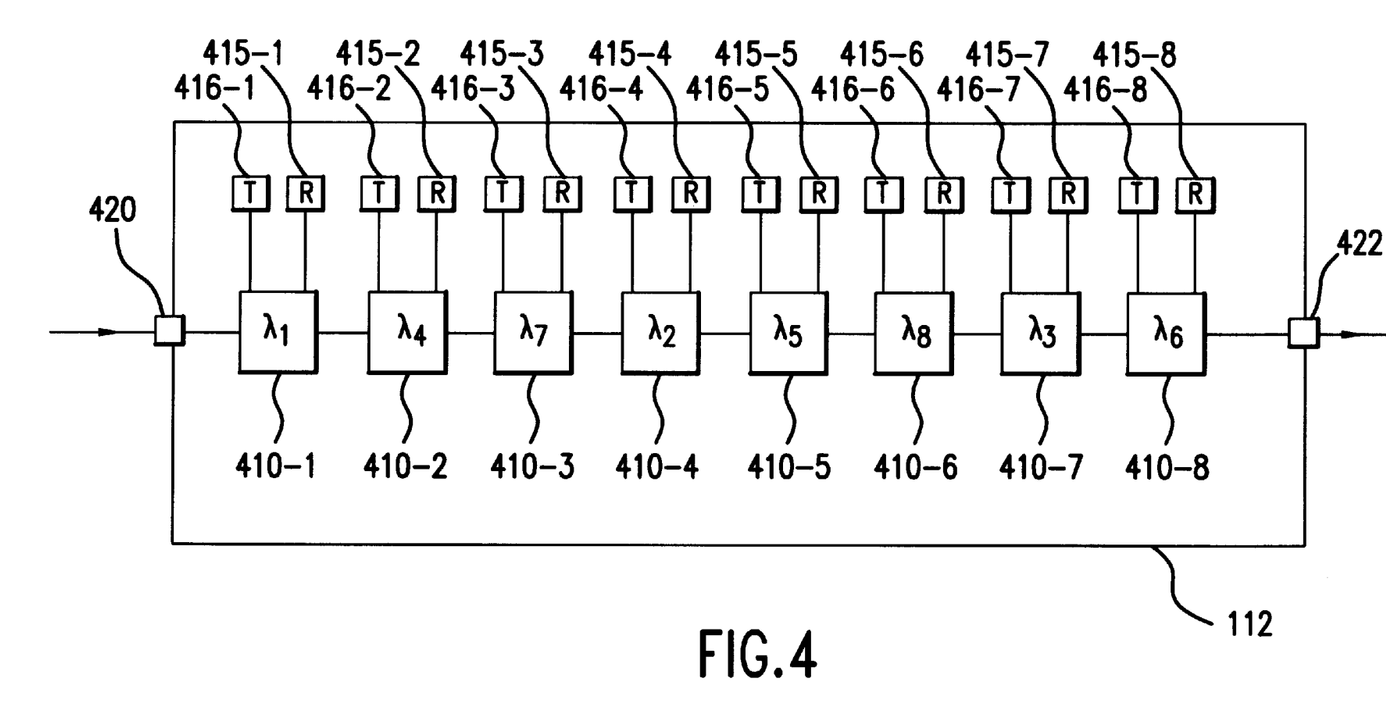
FIG. 4 illustrates a central office node in accordance with the present invention.

Central office node 112 is shown in greater detail in FIG. 4. Central office node 112 includes a plurality of substantially colocated optical add/drop elements 410-1 to 410-8, each of which respectively adding and extracting one of wavelengths $\lambda_{1-8}$. Each of add/drop elements 410-1 to 410-8 has a construction similar to that shown in FIG. 3. In addition, like add/drop element 310 shown in FIG. 3, add/drop elements 410-1 to 410-8 have input ports respectively connected to transmitters 416-1 to 416-8, and output ports respectively connected to a corresponding one of receivers 415-1 to 415-8. As further shown in FIG. 4, optical signals at respective wavelengths $\lambda_{1-8}$ are input to node 112 through an optional connector 420 and output through optional connector 422. Connectors 420 and 422 are typically similar to connectors 311 and 319 discussed above.

In order to minimize adjacent cross-talk in accordance with the present invention, the add/drop elements and their associated transmitters and receivers are arranged about the WDM ring in a manner such that add/drop element associated with adjacent wavelengths (e.g., optical signals at wavelengths $\lambda_1$ and $\lambda_2$) are spaced from one another by at least one complete add/drop element associated with wavelengths that are not next to either of the adjacent wavelengths (e.g., wavelengths $\lambda_4$, $\lambda_5$, $\lambda_6$, $\lambda_7$, or $\lambda_8$). The intermediate add/drop elements, as well as segments of optical fiber linking the nodes, introduce loss that attenuates the optical signal power at the adjacent wavelength and therefore minimizes adjacent channel cross-talk.

For example, an optical signal output from transmitter 416-4 at wavelength $\lambda_2$ in central office node 112 must pass through add/drop elements 410-5 to 410-8, and add/drop elements associated with nodes 114, 116 and 118 before reaching the intended receiver in node 120. The optical signal, therefore, is significantly attenuated because the dielectric filters in each of these add/drop elements imposes about 0.5 dB of loss. The optical signal also accumulates fiber transmission as well as connector losses. If a transmitter outputting an optical signal at an adjacent wavelength $\lambda_1$ in the channel plan were coupled to an add/drop element immediately next to node 120, a significant amount of optical power at wavelength $\lambda_1$ would be received along with the $\lambda_2$ signal. This is because the optical signal at $\lambda_1$ would not be significantly attenuated at node 120 and the passband of the dielectric filters in the add/drop elements are typically broad enough to transmit a portion of this $\lambda_1$ signal. Thus, the receiver in node 120 would not otherwise be able to sufficiently discern the desired optical signal at wavelength $\lambda_2$. In accordance with the present invention, however, the $\lambda_1$ transmitter is provided in node 114 and spaced from node 120 by nodes 116 and 118. The filters in the add/drop elements in nodes 116 and 118 attenuate the $\lambda_1$ signal so that a lower amount is transmitted to the receiver in node 120. The optical signal at wavelength $\lambda_2$ can thus be accurately detected.

Further, each optical signal at a given wavelength typically passes through an equal number of add/drop elements prior to being detected. For example, the number of complete add/drop elements traversed by each optical signal prior to detection is typically n−1, where n is the total number of optical signal wavelengths carried by the WDM ring. For example, in the WDM ring 110 shown in FIG. 1 carrying eight optical signal wavelengths, an optical signal output from transmitter 415-3 at wavelength $\lambda_7$ typically passes through seven (n−1) optical add/drop elements (add/drop elements 410-4 to 410-8 and the add/drop elements associated with nodes 114 and 116) before reaching the intended receiver in node 118. This is also true for each of the remaining optical signals at respective wavelengths $\lambda_{1-6}$ and $\lambda_8$. Thus, no single optical signal has a disproportionately high power loss, at least due to passing through the nodes of the WDM ring, which would otherwise require a shorter transmission path (i.e., small ring circumference) in order to offset such a power loss. Accordingly, the ring circumference can be increased and/or additional add/drop elements can be included to accommodate more optical signals at different wavelengths. It is noted, however, that fiber lengths between successive nodes can vary in accordance with the present invention, i.e., fiber lengths can be asymmetric.

Figure 5A:
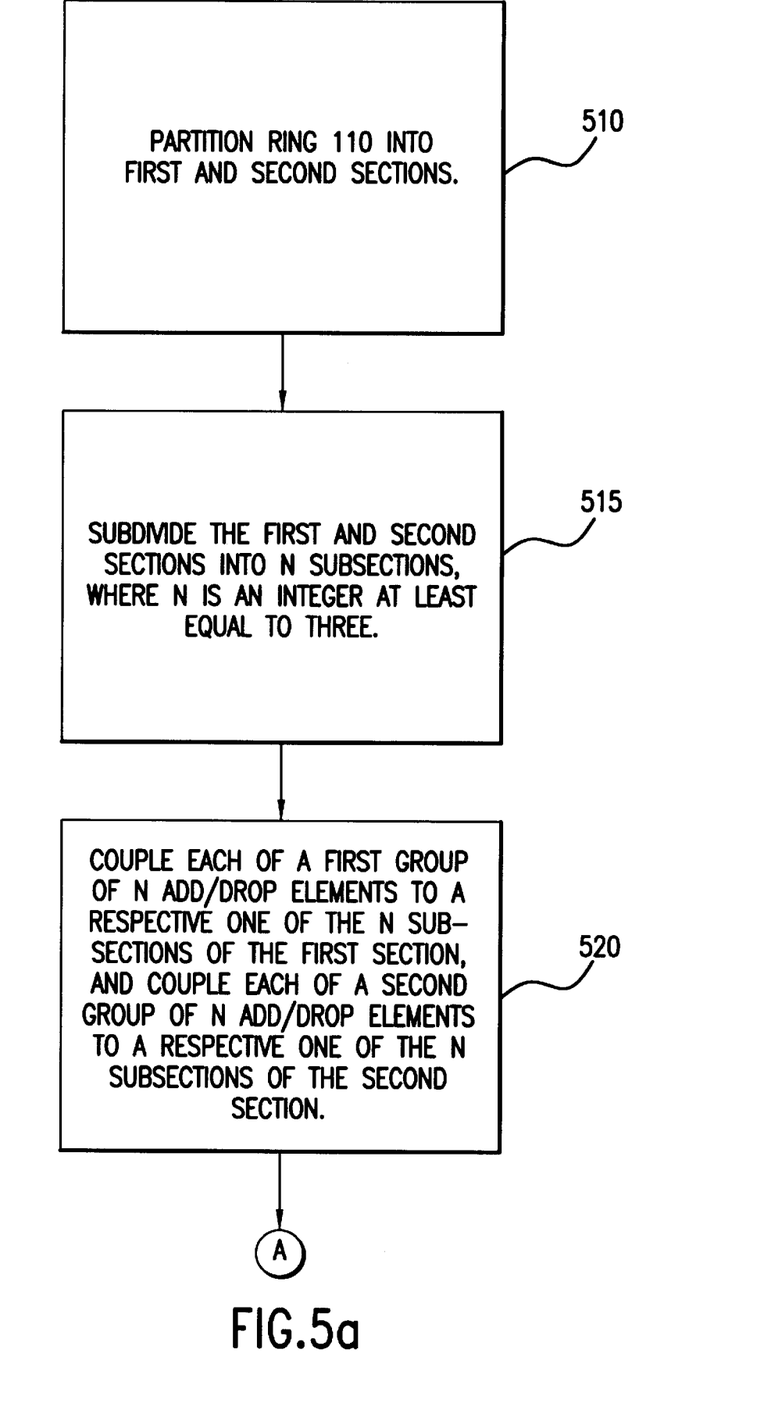
FIGS. 5a and 5b illustrate a methodology for assigning optical add/drop elements in accordance with the present invention.

A methodology for allocating add/drop elements along WDM ring 110 in such a manner as to reduce adjacent channel cross-talk will next be described with reference to FIGS. 5a, 5b, and 6–8. As seen in FIG. 5a, in step 510, WDM ring 110 is conceptualized logically as a circle (see FIGS. 6–8) and partitioned into to first and second sections, for example sections 605 and 610, separated by dashed line 690 in FIG. 6. The first section can, for example, correspond to central hub node 112, while the second section can correspond to the rest of the WDM ring 110. In step 515, each ring section is further subdivided into N subsections, where N is an integer at least equal to three. In the example shown in FIG. 3, ring section 605 is subdivided into three (N=3) subsections 606, 607 and 608, while section 610 is also subdivided into three subsections 611, 612 and 613.

Add/drop elements are coupled to the ring in step 520. In particular, each of a first group of N add/drop elements is coupled to a respective one of the N subsections of the first section, and each of a second group of N add/drop elements is coupled to a respective one of the N subsections of the second section. Thus, in the example shown in FIG. 6, add/drop elements 615, 616, and 617 are coupled to subsections 606, 607 and 608, respectively, and add/drop elements 618, 619 and 620 are coupled to subsections 611, 612 and 620, respectively. Typically, add/drop elements 615–617 are similar in construction to the add/drop elements 410-1, 410-4 and 410-7 discussed above; the numbering in FIG. 6, however, has been changed for convenience.

Figure 5B:
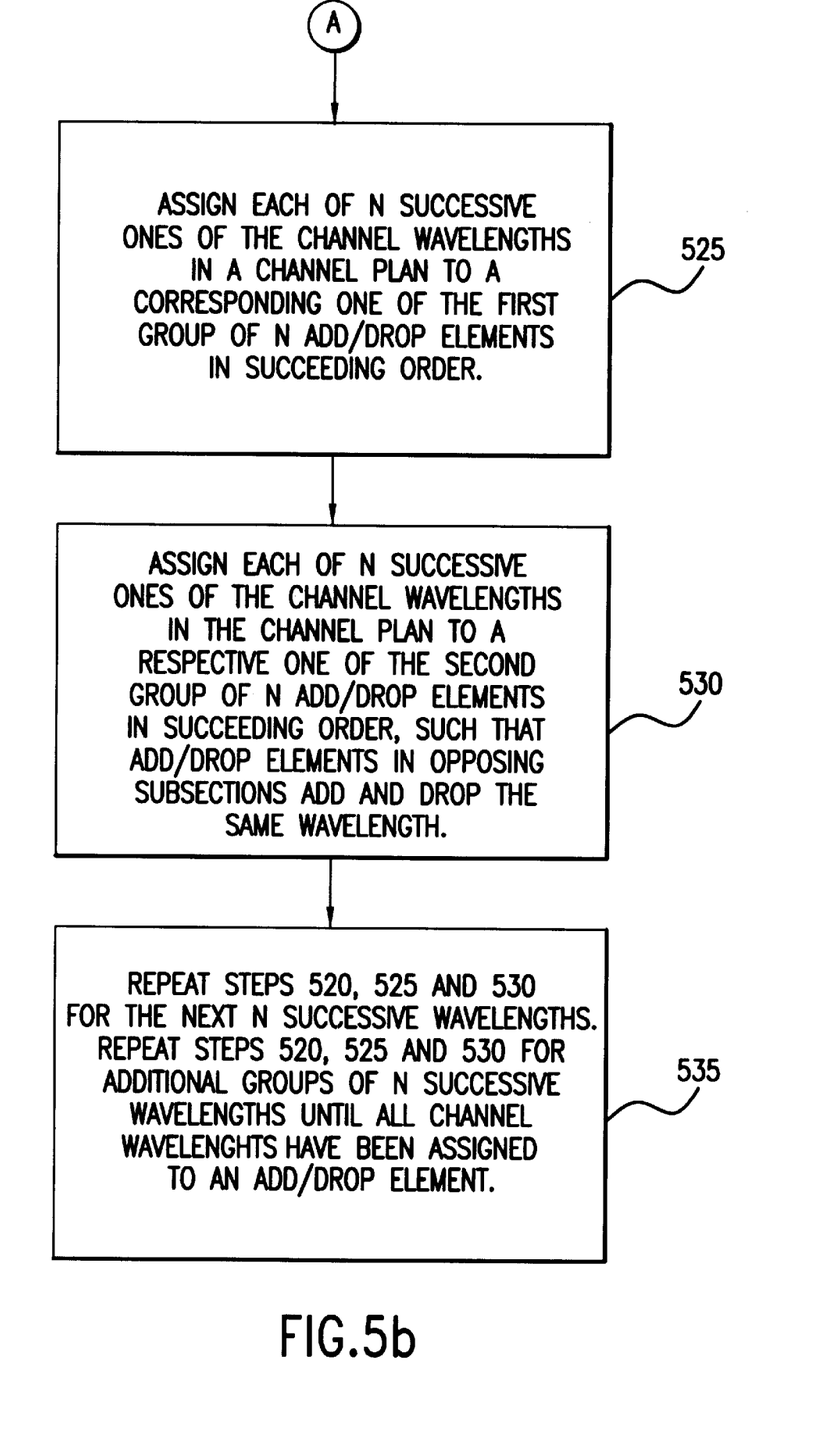
Figure 6:
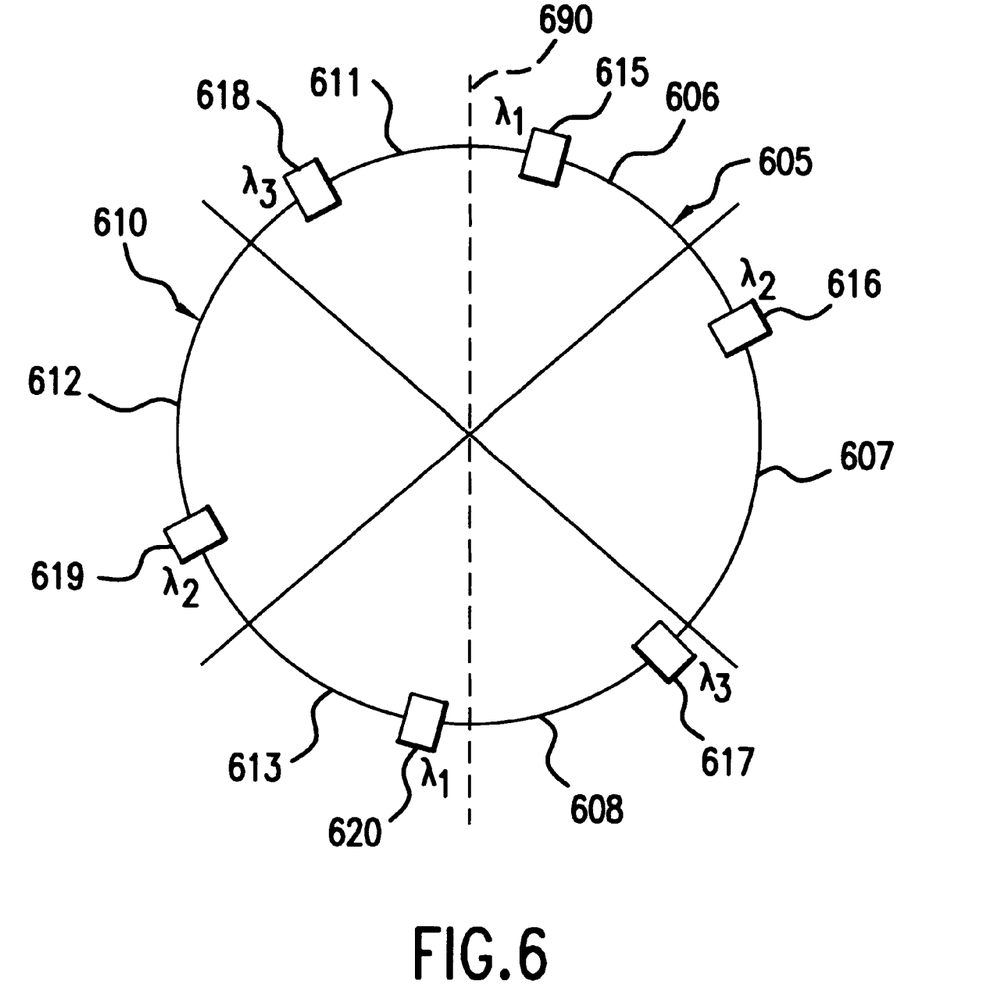
FIG. 6 illustrates a logic diagram of a WDM ring in accordance with the present invention after six add/drop elements have been allocated along the WDM ring.

In step 525 of FIG. 5b, each of N consecutive wavelengths within a channel plan (e.g., the channel plan shown in FIG. 2) is assigned to a corresponding one of the first group of N add/drop elements in succeeding order. Thus, as seen in FIG. 6, optical signals at wavelength $\lambda_1$ are added and dropped at add/drop element 615; optical signals at wavelength $\lambda_2$ are added and dropped at add/drop element 616; and optical signals at wavelength $\lambda_3$ are added and dropped at add/drop element 617.

In step 530, N successive wavelengths in the channel plan are also assigned to a respective one of the second group of N add/drop elements in succeeding order. The wavelengths are assigned, however, in such a way that optical add/drop elements in opposing subsections add and drop optical signals at the same wavelength. Accordingly, as seen in FIG. 6, add/drop elements 618, 619 and 620 are respectively coupled to subsections 611, 612 and 613, and respectively add and drop wavelengths $\lambda_3$, $\lambda_2$ and $\lambda_1$. As further shown in FIG. 6, add/drop elements 618, 619 and 620 are provided in subsections opposite add/drop elements 617, 616 and 615, respectively. Moreover, add/drop elements 618, 619 and 620 add and drop optical signals at the same wavelength as add/drop elements 617, 616 and 615, respectively.

Figure 7:
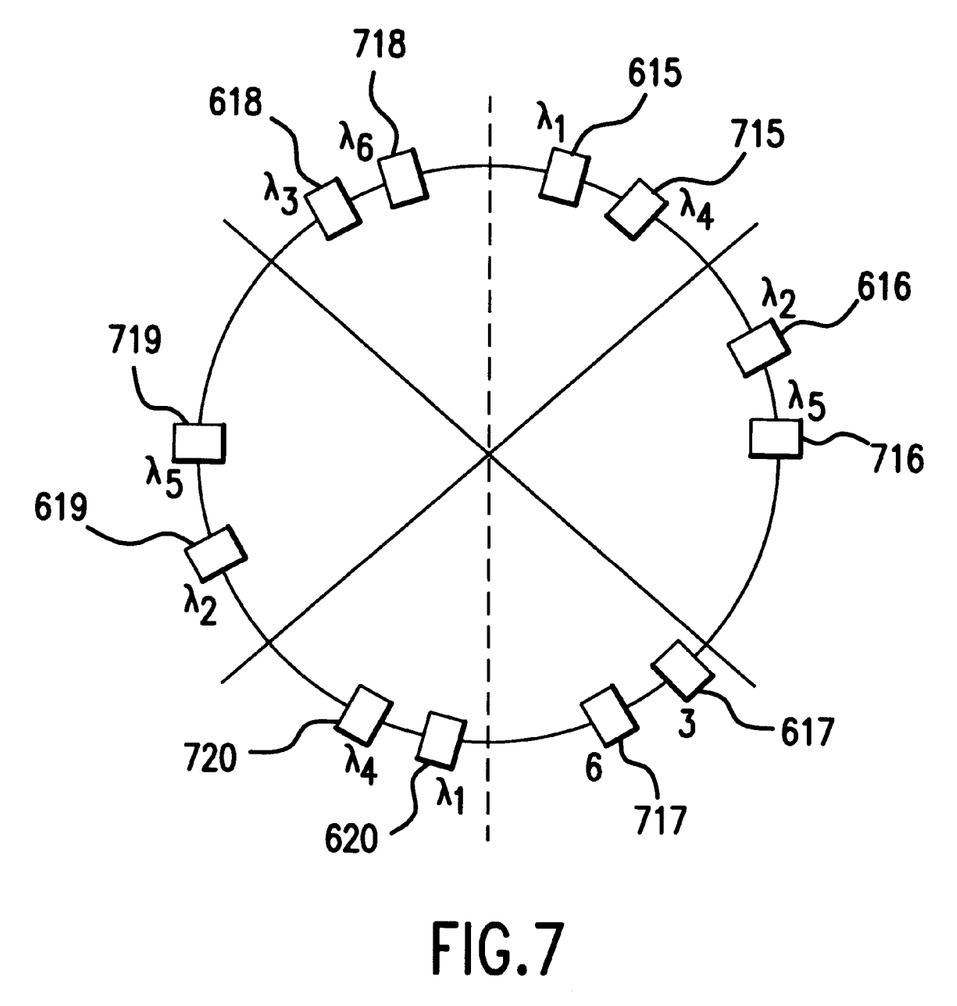
FIG. 7 illustrates a logic diagram of a WDM ring in accordance with the present invention after 12 add/drop elements have been allocated along the WDM ring.

Returning to FIG. 5b, in step 535, steps 520, 525 and 530 are repeated for the next N successive wavelengths of the channel plan. For example, as seen in FIG. 7, add/drop elements 715, 716 and 717 are respectively coupled to subsections 606, 607 and 608 in first section 605, and add/drop elements 718, 719 and 720 are respectively coupled to opposing subsections 611, 612 and 613. Moreover, add/drop elements 715 and 720 in opposing subsections add and drop optical signals at the same wavelength, $\lambda_4$; add/drop elements 716 and 719 add and drop optical signals at the same wavelength, $\lambda_5$; and add/drop elements 718 and 717 add and drop optical signals at the same wavelength, $\lambda_6$.

Steps 520, 525 and 530 are repeated for successive groups of N wavelengths within the channel plan, until all wavelengths have been assigned to an add/drop element. It is noted that the channel plan need not include an integer multiple of N wavelengths. In which case, after the last group of N wavelengths has been allocated, the remaining wavelengths are assigned to respective add/drop elements, which, in turn, are coupled to corresponding subsections in such a manner that adjacent wavelengths in the channel plan are neither added nor dropped at adjacent add/drop elements. Moreover, within each subsection, add/drop elements can be placed in any order provided that the added and dropped optical signals are not at a wavelength adjacent the wavelength of optical signals added or dropped by an adjacent add/drop element.

By using the above methodology, optical signals at adjacent wavelengths in a channel plan are not added and dropped at adjacent add/drop elements, thereby minimizing adjacent channel crosstalk.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical communication apparatus, comprising:

a plurality of optical emitters, each supplying a corresponding one of a plurality of optical signals, each of said optical signals being at a respective one of a plurality of wavelengths, said plurality of wavelengths conforming to a channel plan whereby said plurality of wavelengths successively increase from a lowest wavelength to a highest wavelength, said plurality of wavelengths including said lowest and highest wavelengths;

a first plurality of optical add/drop elements respectively coupled to corresponding ones of said plurality of optical emitters and configured to be coupled to an optical communication path, said first plurality of optical add/drop elements supplying said plurality of optical signals to said optical communication path; and a second plurality of optical add/drop elements configured to be coupled to said optical communication path, one of said second plurality of optical add/drop elements selecting a first one of said plurality of optical signals at a first one of said plurality of wavelengths, said one of said second plurality of optical add/drop elements being provided adjacent one of said first plurality of optical add/drop elements coupled to one of said plurality of optical emitters supplying a second one of said plurality of optical signals at a second one of said plurality of wavelengths, said second one of said plurality of wavelengths being spaced from said first one of said plurality of wavelengths by at least one wavelength in said channel plan.

2. An optical communication apparatus in accordance with claim 1, further comprising:
 a plurality of additional optical emitters, each of which being coupled to a respective one of said second plurality of optical add/drop elements, and each supplying a corresponding one of said plurality of optical signals to said optical communication path via said respective one of said second plurality of optical add/drop elements; and
 a plurality of optical receivers, each of which being coupled to a respective one of said first and second pluralities of optical add/drop elements, each of a first group of said plurality of optical receivers being coupled to a respective one of said first plurality of optical add/drop elements, and each of a second group of said plurality of optical receivers being coupled to a respective one of said second plurality of optical add/drop elements.

3. An optical communication apparatus in accordance with claim 1, further comprising an optical receiver coupled to said second one of said second plurality of optical add/drop elements.

4. An optical communication apparatus in accordance with claim 1, wherein each of said first and second pluralities of optical add/drop elements comprises a filtering element.

5. An optical communication apparatus in accordance with claim 1, wherein a plurality of optical receivers are respectively coupled to each of said second plurality of optical add/drop elements.

6. An optical communication apparatus in accordance with claim 1, wherein said optical communication path has a ring configuration.

7. An optical communication apparatus in accordance with claim 1, wherein each of said first plurality of optical add/drop elements is substantially colocated in a central hub.

8. An optical communication apparatus, comprising:
 a plurality of optical emitters, each supplying a corresponding one of a plurality of optical signals, each of said optical signals being at a respective one of a plurality of wavelengths, said plurality of wavelengths conforming to a channel plan whereby said plurality of wavelengths successively increase from a lowest wavelength to a highest wavelength, said lowest and highest wavelengths being included in said plurality of wavelengths;
 a plurality of optical add/drop elements, each of a first subgroup of said plurality of add/drop elements respectively coupled to corresponding ones of said plurality of optical emitters and configured to be coupled to an optical communication path, said first subgroup of said plurality of optical add/drop elements supplying said plurality of optical signals to said optical communication path, each of a second subgroup of said plurality of add/drop elements respectively selecting one of said plurality of optical signals from said optical communication path, and being spaced, along said optical path, from one of said first subgroup of add/drop elements coupled to one of said plurality of optical emitters supplying another one of said plurality of optical signals at one of said plurality of wavelengths in said channel plan adjacent a wavelength of said one of said plurality of optical signals by at least one of said optical add/drop elements; and
 a plurality of optical receivers, each of which being respectively coupled to one of said second subgroup of said add/drop elements.

9. An optical communication apparatus in accordance with claim 8, wherein said first subgroup of said plurality of optical add/drop elements further select a corresponding one of said plurality of optical signals, said optical communication apparatus further comprising:
 a plurality of additional optical receivers, each of which being coupled to a respective one of said first subgroup of said plurality of optical add/drop elements, and respectively receiving one of said plurality of optical signals from said first subgroup of said plurality of optical add/drop elements; and
 a plurality of additional optical emitters, each of which being coupled to a respective one of said second subgroup of said plurality of optical add/drop elements, each of said plurality of additional optical emitters supplying a corresponding one of said plurality of optical signals to said optical communication path via said respective one of said second subgroup of said plurality of optical add/drop elements.

10. An optical communication apparatus in accordance with claim 8, wherein each of said plurality of add/drop elements comprises a filtering element.

11. An optical communication apparatus in accordance with claim 8, wherein each of said first subgroup of said plurality of optical add/drop elements is substantially colocated in a central hub.

12. A method for allocating a plurality of optical add/drop elements along a closed optical communication path, said optical communication path being configured to carry a plurality of optical signals, each at a respective one of a plurality of wavelengths, each of said plurality of wavelengths conforming to a channel plan, a first group of said plurality of optical add/drop elements, each being configured to add and drop a respective one of said plurality of optical signals, and a second group of said plurality of optical add/drop elements, each being configured to add and drop a corresponding one of said plurality of optical signals, said method comprising the steps of:
 partitioning said closed optical communication path into first and second sections;
 subdividing said first section of said closed optical communication path into a plurality of first subsections;
 subdividing said second section of said optical communication path into a plurality of second subsections;
 coupling each of said first group of said plurality of add/drop elements to a respective one of said first subsections, successive ones of said coupled first group of said plurality of add/drop elements being respectively configured to add and drop one of said plurality of optical signals at a successive one of said plurality of wavelengths within said channel plan; and
 coupling each of said second group of said plurality of add/drop elements to a respective one of said second subsections.

13. A method in accordance with claim 12, wherein successive ones of said second group of said plurality of add/drop elements along said second section of said closed optical communication path are respectively configured to add and drop one of said plurality of optical signals at a successive one of said plurality of wavelengths within said channel plan.

14. A method in accordance with claim 12, wherein said step of coupling each of said second group of said plurality of add/drop elements further comprises the step of coupling one of said second group of said plurality of add/drop elements to one of said second subsections lying opposite one of said first subsections, said one of said second group of said plurality of add/drop elements and one of said first group of said plurality of add/drop elements coupled to said one of said first subsections being configured to add and drop optical signals at the same one of said plurality of wavelengths.

15. A method of allocating a plurality of optical add/drop elements along an optical communication path, said optical communication path being configured to carry a plurality of optical signals, each at a respective one of a plurality of wavelengths, each of said plurality of wavelengths conforming to a channel plan, a first group of said plurality of optical add/drop elements, each being configured to add and drop a respective one of said plurality of optical signals, and a second group of said plurality of optical add/drop elements, each being configured to add and drop a corresponding one of said plurality of optical signals, said method comprising the steps of:

partitioning said optical communication path into first and second sections;

subdividing said first section of said optical communication path into first N subsections, where N is an integer at least equal to three;

subdividing said second section of said optical communication path into second N subsections;

coupling each of a first group of said plurality of optical add/drop elements to a respective one of said first N subsections, successive ones of said coupled first group of said plurality of add/drop elements being configured to add and drop a respective one of a group of said plurality of optical signals at successive ones of said plurality of wavelengths in said channel plan; and coupling each of a second group of said plurality of optical add/drop elements to a respective one of said second N subsections.

16. A method in accordance with claim 15, wherein successive ones of said coupled second group of said plurality of add/drop elements being configured to add and drop a respective one of another group of said plurality of optical signals at said successive ones of said plurality of wavelengths in said channel plan.

17. A method in accordance with claim 15, wherein said step of coupling each of said second group of said plurality of add/drop elements further comprises the step of coupling one of said second group of said plurality of add/drop elements to one of said second subsections lying opposite one of said first subsections, said one of said second group of said plurality of add/drop elements and one of said first group of said plurality of add/drop elements coupled to said one of said first subsections being configured to add and drop optical signals at the same one of said plurality of wavelengths.

18. A method in accordance with claim 15, further comprising the steps of:

coupling each of a third group of said plurality of optical add/drop elements to a respective one of said first N subsections, successive ones of said coupled third group of said plurality of add/drop elements being configured to add and drop a respective one of another group of said plurality of optical signals at additional successive ones of said plurality of wavelengths in said channel plan; and coupling each of a fourth group of said plurality of optical add/drop elements to a respective one of said second N subsections.

19. A method in accordance with claim 18, further comprising the steps of:

coupling each of a third group of said plurality of optical add/drop elements to a respective one of M ones of said first N subsections, M being an integer less than N, successive ones of said coupled third group of said plurality of add/drop elements being configured to add and drop a respective one of an additional group of said plurality of optical signals at further ones of said plurality of wavelengths in said channel plan; and coupling each of a fourth group of said plurality of optical add/drop elements to a respective one of M ones of said second N subsections.

* * * * *